(12) United States Patent
Brewer et al.

(10) Patent No.: US 11,045,863 B2
(45) Date of Patent: Jun. 29, 2021

(54) APPARATUS FOR THE REMOVAL OF A CIRCULAR COLLAR SWAGE MOUNTED ON A CYLINDRICAL PROJECTION

(71) Applicant: AVDEL UK LIMITED, Sheffield (GB)

(72) Inventors: Jonathan Brewer, Letchworth Garden (GB); Philip Wasmuth, Letchworth Garden (GB)

(73) Assignee: Avdel UK Limited, Letchworth Garden (GB)

( * ) Notice: Subject to any disclaimer, the term of this patent is extended or adjusted under 35 U.S.C. 154(b) by 0 days.

(21) Appl. No.: 16/704,615

(22) Filed: Dec. 5, 2019

(65) Prior Publication Data

US 2020/0147674 A1 May 14, 2020

Related U.S. Application Data

(63) Continuation of application No. PCT/EP2018/068399, filed on Jul. 6, 2018.

(30) Foreign Application Priority Data

Jul. 7, 2017 (GB) ..................................... 1710921

(51) Int. Cl.
*B21J 15/50* (2006.01)
*B23D 15/04* (2006.01)
*B23D 29/00* (2006.01)
*B23D 33/02* (2006.01)
*F16B 19/05* (2006.01)

(52) U.S. Cl.
CPC ............. *B21J 15/50* (2013.01); *B23D 15/04* (2013.01); *B23D 29/007* (2013.01); *B23D 33/02* (2013.01); *F16B 19/05* (2013.01)

(58) Field of Classification Search
CPC ........ B21J 15/50; B23D 15/04; B23D 29/007; B23D 33/02; F16B 19/05
See application file for complete search history.

(56) References Cited

U.S. PATENT DOCUMENTS

| | | | |
|---|---|---|---|
| 2,526,955 A | 10/1950 | Kugler | |
| 2,836,888 A * | 6/1958 | Hargrove | ............. B23D 29/007 30/272.1 |
| 4,807,348 A | 2/1989 | Kaelin et al. | |
| 4,862,773 A | 9/1989 | Batten | |
| 5,095,779 A | 3/1992 | Batten | |
| 5,438,891 A | 8/1995 | Batten | |

(Continued)

FOREIGN PATENT DOCUMENTS

| | | | |
|---|---|---|---|
| DE | 29511530 U1 * | 9/1995 | ........... B23D 29/007 |
| GB | 2444420 B | 9/2008 | |
| WO | 2014041328 A | 3/2014 | |

OTHER PUBLICATIONS

Office Action dated Mar. 5, 2021 cited in corresponding Chinese Application No. 2021030202701650. English translation not available.

*Primary Examiner* — Omar Flores Sanchez
(74) *Attorney, Agent, or Firm* — Kofi A. Schulterbrandt

(57) ABSTRACT

Apparatus is disclosed for attaching to a lockbolt via a swaged-mounted collar. The apparatus includes an element which permits relative movement between a cutting blade and an opposing surface so that the collar is held centrally within the apparatus during cutting.

10 Claims, 13 Drawing Sheets

(56) References Cited

U.S. PATENT DOCUMENTS

| | | |
|---|---|---|
| 7,059,216 B2 | 6/2006 | Haines, Jr. |
| 7,293,339 B2 | 11/2007 | Mercer et al. |
| 10,094,410 B2 | 10/2018 | Brewer et al. |
| 2006/0090321 A1 | 5/2006 | Haines, Jr. |
| 2011/0203116 A1* | 8/2011 | Vary ........................ B26B 17/02 30/187 |
| 2017/0361370 A1* | 12/2017 | Godfrey ................. B21J 15/105 |
| 2018/0133815 A1* | 5/2018 | Williams ............. B23D 29/007 |

* cited by examiner

APPARATUS FOR THE REMOVAL OF A CIRCULAR COLLAR SWAGE MOUNTED ON A CYLINDRICAL PROJECTION

CROSS-REFERENCE TO RELATED APPLICATIONS

This application is a continuation of PCT Application No. PCT/EP2018/068399, filed on Jul. 6, 2018 which claims priority from British Application No. 1710921.6, filed on Jul. 7, 2017, the entire disclosure of which is incorporated herein by reference.

BACKGROUND OF THE PRESENT INVENTION

The present invention relates to swaged-collar type fasteners, commonly referred to as "lockbolts". Lockbolts are employed where there is a desire to couple or clamp together two or more discrete elements (such as sheets of metal) under high force and so that the coupling is permanent. An example of the forces employed in smaller lockbolts (up to 6.3 mm diameter, for example) would be around 8.5 kN of clamp, whereas larger lockbolts (say, 19 mm diameter) provide around 136 kN of clamp. After such coupling, the only way in which the lockbolt can be removed would be to destroy the lockbolt fitment, thereby compromising the mechanical coupling between the previously-fastened elements. Examples of industrial applications for lockbolts include vehicle manufacture where components of the vehicle chassis, for example, need to be connected or coupled together. The swaged collar is permanently engaged with locking grooves formed on a locking pin and will not work loose as might a conventional nut and bolt fastening due to vibrations. This permanent mechanical connection of a collar to a pin lockbolt fasteners are highly tamper resistant and, hence, are suited for security fences, guards and the like.

The invention has particular, although not exclusive, relevance to lockbolts employed to couple together individual elements which elements may need to be subsequently uncoupled for re-work, cleaning, treatment, repair, or the like.

Swage-type fasteners often employ a flanged metal collar to be attached to a pin. The attachment needs to be permanent, in order to prevent the collar becoming detached from the pin. In some instances, therefore, rather than employ a helically-threaded pin, the collar is attached to a pin which carries series of axially-spaced, discrete annular lock grooves. When swaging the collar to the pin, the material of the collar flows into these lock grooves during the attachment process and forms a permanent lock between the collar and pin.

The load required to swage the collar onto the pin is provided by a placing tool. The placing tool must grip onto the pin to resist the reaction to the axial swaging force and, typically, the tool engages with one or more pull-grooves formed on the proximal end of the pin. For this type of lockbolt the pulling groove region formed at the distal end of the pin remains attached to the pin during full swaging of the collar and, as such, the pulling region remains as a cylindrical projection above the swaged collar after the placing tool is removed. An example of this type of attachment process is described, for example, in WO 2014/041328.

GB2444420 discloses an alternative form of swaging attachment between a pin and collar in which a helically-threaded lock groove is employed. Whilst this method of attachment, in theory, leaves itself open to the possibility of the collar unthreading itself from the helical thread, in practice the high pressures and contact areas mean these collars are also highly resistant to vibrations or forced removal, so they are a viable alternative to the annular locking groove swaging operation described above.

Irrespective of which of the above two types of swaging operation are carried out on the collar, as described above, the collar usually takes the form of a right- or tapered cylinder, which may be flanged. Whether or not the collar initially bears a flange, after the setting operation, particularly following swaging, a flange-like formation will be created on the collar closest to the fastened elements. This is due to pressure being applied to the outer surface of the collar both radially inwardly and axially, resulting in plastic flow of collar material which then pools in an annulus at the axial end of the collar adjacent the fastened elements.

If, having locked the collar to the pin via a swaging operation, it is required to release the lock between the pin and collar (for example, for the need for a maintenance operation on the elements coupled together by the lockbolt), the best way to achieve this without potentially damaging the coupled elements is for the collar to be cut. To do this should, preferably, leave the remaining pin undamaged so that it can be re-used with a replacement collar once the maintenance operation is complete. In any event, even if damage to the pin cannot be avoided when the collar is cut, avoiding damage to the coupled elements is imperative. The need to be able to re-couple the elements together after the maintenance operation will require a subsequent swaging operation on a new lockbolt pin and collar (or at least a lockbolt employing a new collar, where the pin can be re-used).

Regardless of whether the type of lockbolt having a collar to be cut is of the WO 2014/041328 type, or of the GB2444420 type, a common problem in cutting the collar is that the flange of the set collar to be removed can cause any cutting implement (such as steel blades) to "ramp up" the flange (due to its axial chamfer), or be radially diverted from its original path (due to the round circumferential shape of the flange causing the blade to "kick" on impact with the flange). If the cutting implement were to contact the collar at an angle other than parallel to the radius of the collar during the cutting process, then a clean cut of the collar may not be achieved. Such could result in the collar not being cut from the pin, but merely damaged. Alternatively, or additionally, such might also damage the cutting implement.

A further problem with removing a collar which is swaged to a pin is that in the case where a plurality of cutting elements are employed to cut the collar, they should, ideally, be centralized on the collar both immediately before and during the cutting operation. Such ensures the collar is cut either from two sides such that the cut collar may readily fall from, or be easily removed from, the pin. If the collar is not cut from two sides thereof, then as it is generally formed from metal, its removal from the pin following the cutting operation, may not be possible without the need for further cutting or hydraulic shearing or the like. Such is undesirable as it takes time to perform these extra operations after the main cutting has completed. Whilst it is possible to cut the collar from the pin using a single cut, this would still leave the problem of removing the cut collar form the pin; whereas if the collar is cut simultaneously with two cuts (ideally diametrically opposite each other), then the cut collar simply falls away from the pin.

SUMMARY OF THE PRESENT INVENTION

It is hence an object of the present invention to at least alleviate the aforementioned shortcomings. Accordingly the present invention provides apparatus for the removal of a circular collar swage-mounted on a cylindrical projection, the apparatus comprising: a connection member for connecting the apparatus to the cylindrical projection, which cylindrical projection defines a major axis of the apparatus when the connection member is connected thereto; at least one moveable cutting member for selective engagement with the collar after the connection member is connected to the cylindrical projection; an opposing member arranged to be mounted within the apparatus opposite the at least one moveable cutting member; the apparatus characterized in that relative movement between the connection member and the at least one moveable cutting member and/or the opposing member permits the collar to be centrally located between the at least one moveable cutting member and the opposing member. By arranging for relative movement to be possible between the connection member and the at least one moveable cutting member and/or the opposing member, such an arrangement ensures the collar to be cut will always be centralised between the at least one moveable cutting member and the opposing member. This ensures that the collar is subject to a balanced cutting force applied by the at least one cutting member and the opposing member, which provides a reaction surface to the cutting member.

It is preferable that the relative movement between the connection member and the at least one moveable cutting member and/or the opposing member is occasioned by movement of the connection member. Preferably the connection member is formed in a translation means, which translation means permits travel of the connection member in a linear path between the at least one moveable cutting member and the opposing member. Use of the translation means ensures that the connection member is always centrally located between the at least one moveable cutting member and the opposing member in advance of commencement of the cutting operation. This ensures centralization of the collar within the apparatus during the cutting operation.

Advantageously the linear path of the translation means is along a diameter, with respect to the major axis, the circumferential ends of which diameter are between the connection member and the at least one moveable cutting member or the opposing member, such that the translation means may travel freely along this diametric path. Employing the diameter as the path of the translation means again assists to ensure centralization of the collar relative to the apparatus during the cutting operation.

The opposing member may include or comprises a second cutting member. Whilst the possibility of using the opposing member as a force reaction surface to the at least one cutting member is useful, doubling up this use to include the ability to also cut the collar is particularly advantageous. Preferably the opposing member is immovable, although it may move toward or away from the collar during the cutting operation.

Advantageously the engagement of the at least one cutting member with the collar cuts the collar from the cylindrical projection. Additionally the opposing member may cut the collar from the cylindrical projection, preferably in a second, diametrically opposite direction.

The connection member may comprise an adjustable collet which clamps around the cylindrical projection, thereby to ensure the at least one cutting member does not "ramp up" over the flange formed on the collar.

BRIEF DESCRIPTION OF THE DRAWINGS

The present invention will now be described, by way of example only and with reference to the accompanying drawings, of which.

DETAILED DESCRIPTION OF THE PREFERRED EMBODIMENTS

Figure 1:
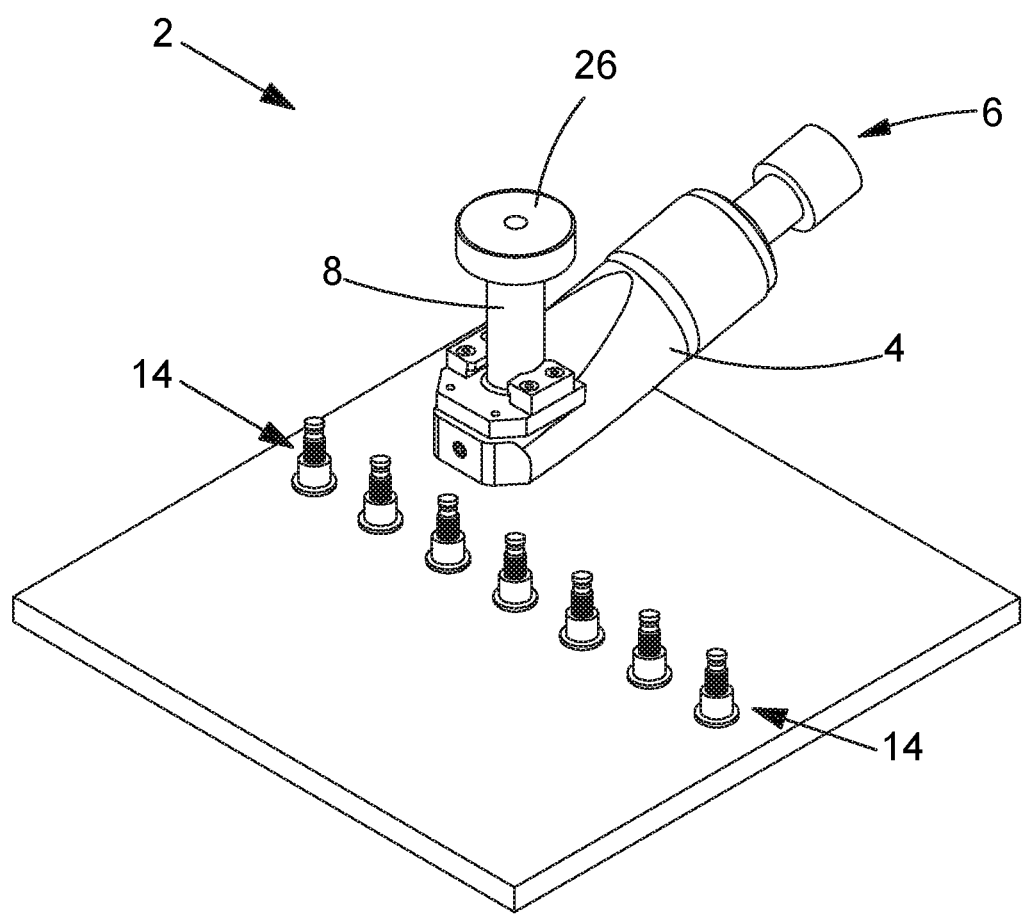
FIG. 1 illustrates a perspective view of the apparatus in accordance with the present invention and a series of set lockbolts placed in a sheet material.
Figure 2:
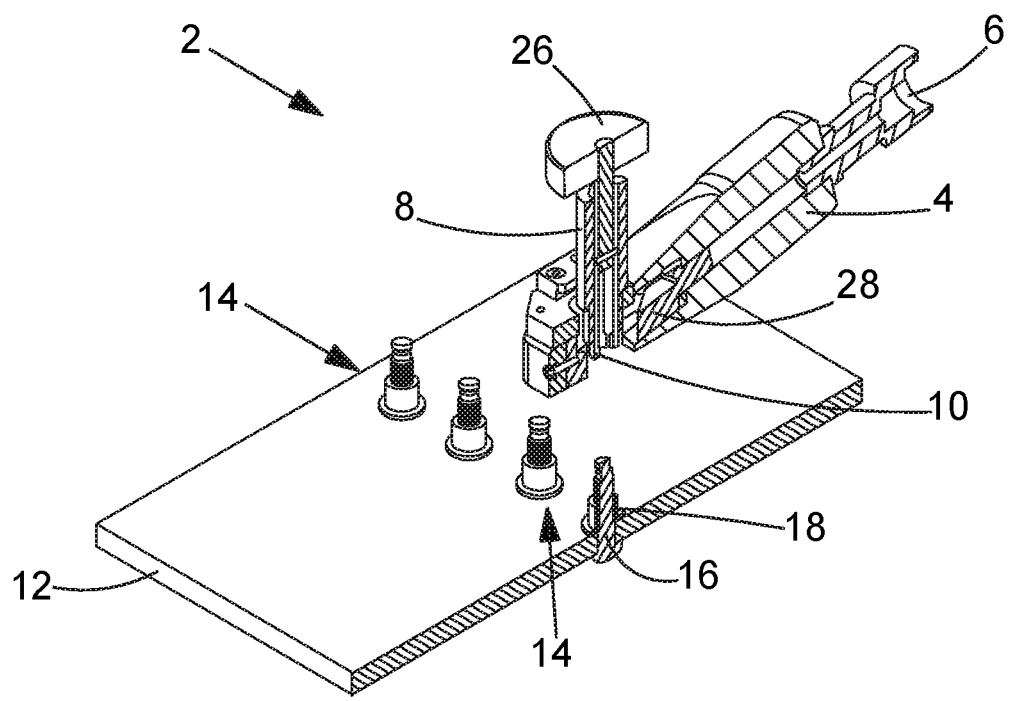
FIG. 2 illustrates schematically a part-sectional perspective view of the apparatus of FIG. 1.
Figure 3:
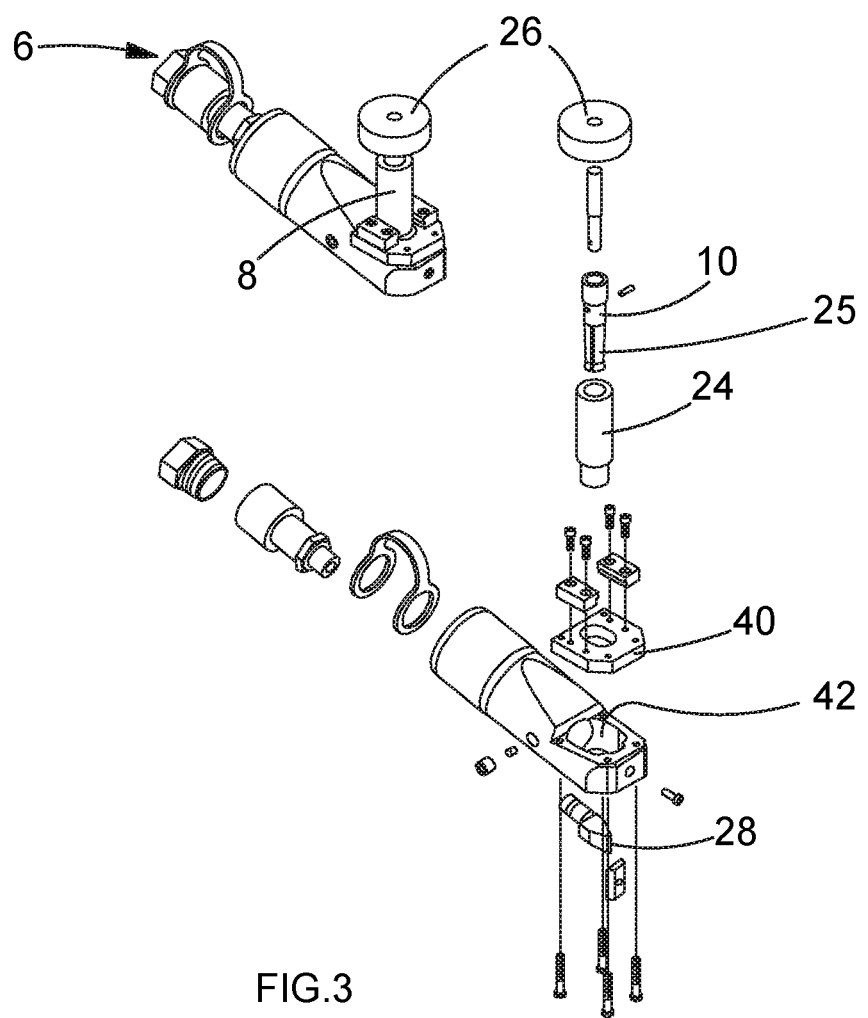
FIG. 3 illustrates an exploded perspective view of the apparatus in accordance with the present invention.

Referring now to FIGS. 1, 2 and 3 it can be seen that the apparatus, shown generally as 2 comprises a main body 4 having, at one end thereof a port 6 for pressurized oil and, at the other end thereof, a user-actuable turret 8. The turret 8 is coupled to a collet 10 formed therein. The purpose and operation of the turret 10 will be explained below.

Figure 12:
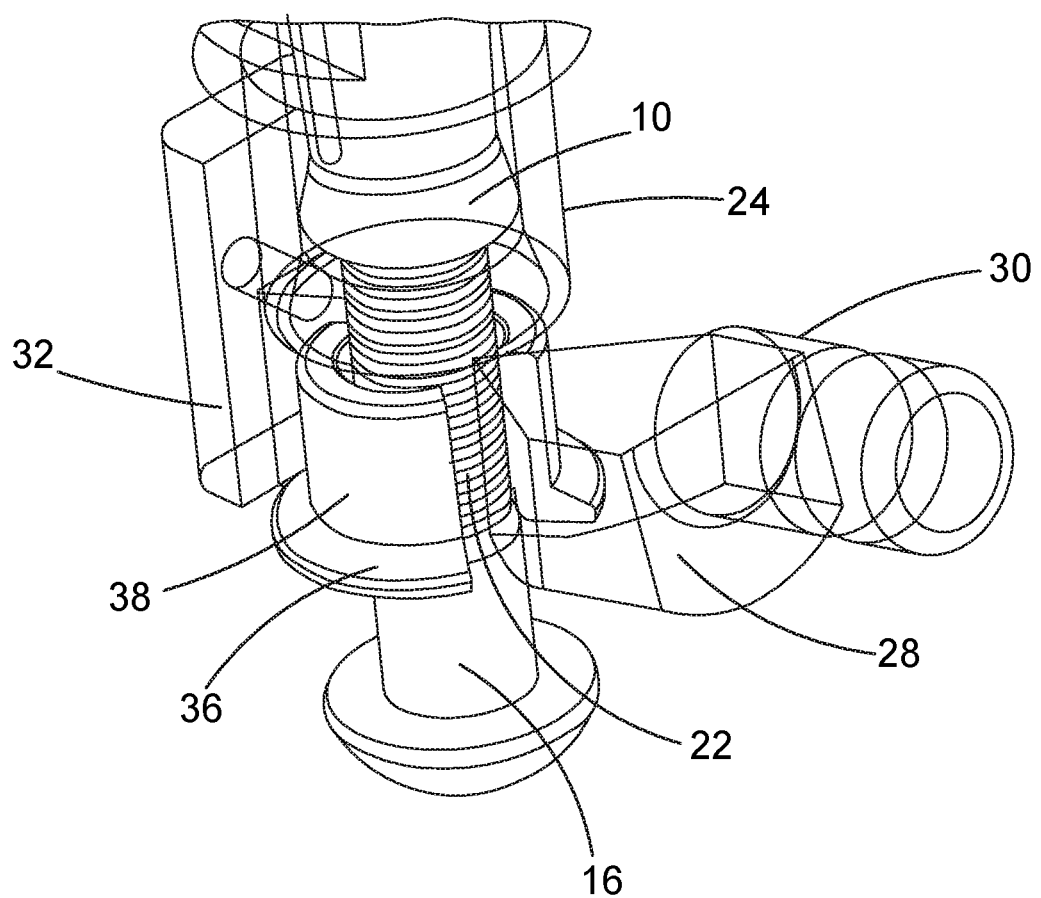
FIG. 12 shows an outline perspective of a lockbolt having the swaged collar therefrom having been cut by the apparatus of FIG. 1.
Figure 13:
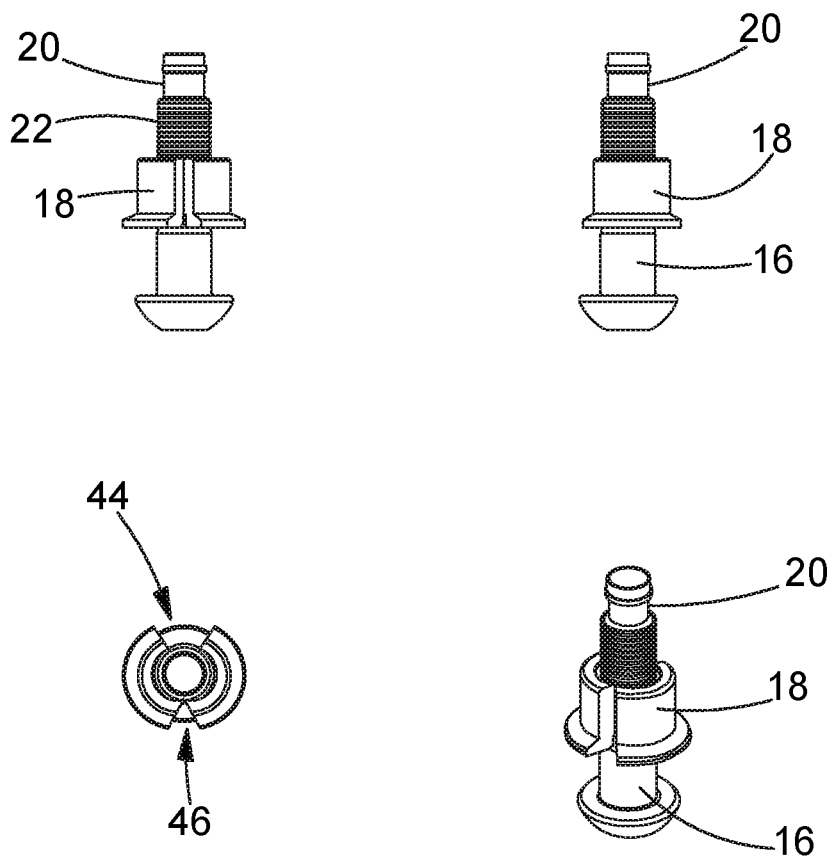
FIG. 13 shows a series of views illustrating the collar having been cut from the lockbolt.

Shown in the drawings mounted on a pre-drilled sheet of metal 12 are a series of lockbolts 14. Each lockbolt 14 is formed from a cylindrical projection, here central circular pin portion 16, around which projection has been swaged a circular collar 18 in known manner. As will be appreciated by those skilled in the art, the pin 16 may have an annular pull-groove 20 forming a grip portion for engagement with a gripping member used hold the pin against movement during the swaging process by which the collar is pressed both axially along and radially inwardly to permanently grip the pin. To aid with this permanent securing of the collar 18 to the pin 16 (thereby forming the lockbolt), the pin may additionally carry a series of annular lock grooves, or alternatively a helical thread form, again, in known manner. In this example, the pin 16 carries a series of annular lock grooves 22 (seen most clearly in FIGS. 4 and 12).

Figure 4:
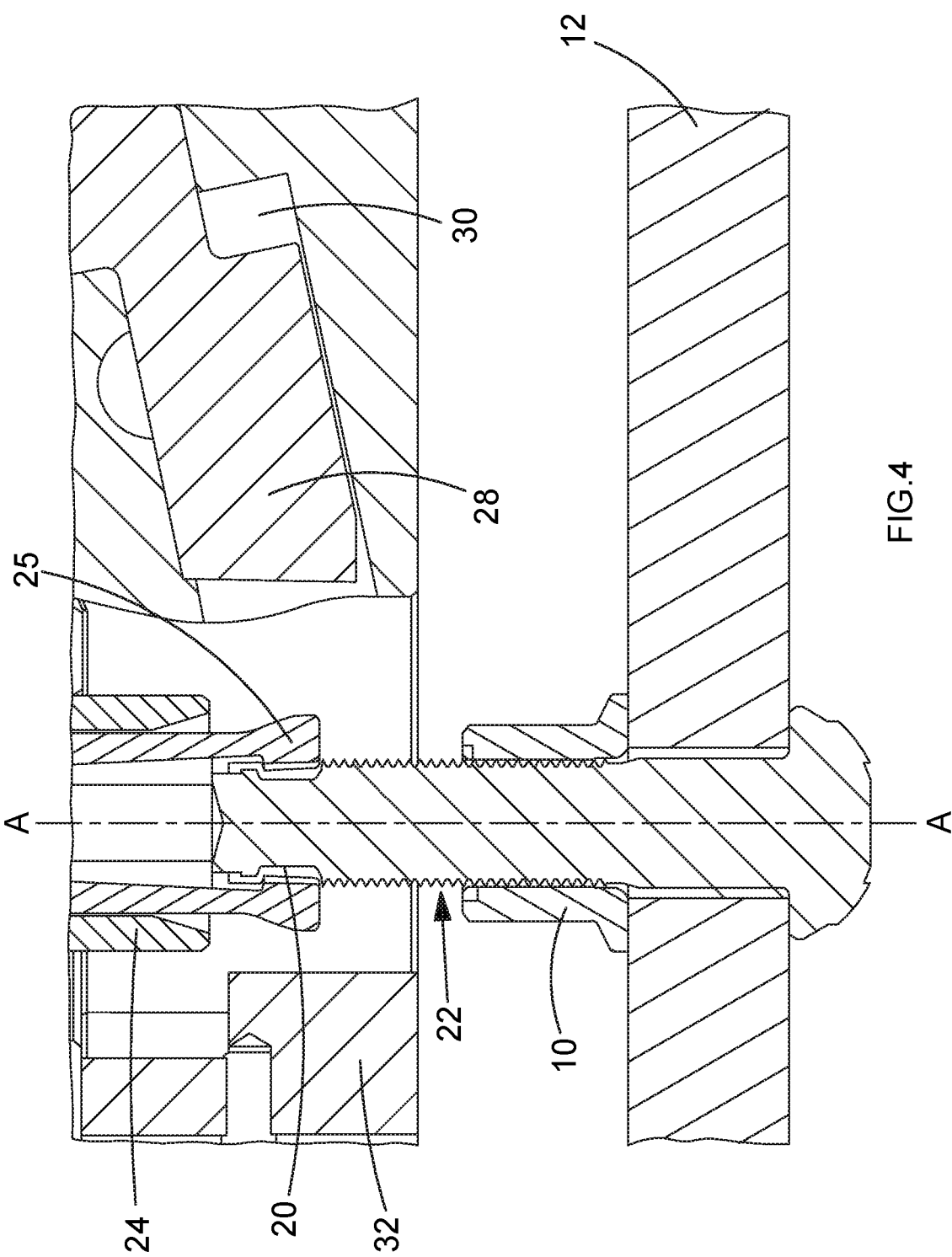
FIG. 4 shows a side sectional view of the apparatus of FIG. 1 in place over a lockbolt ready to cut the collar therefrom.
Figure 5:
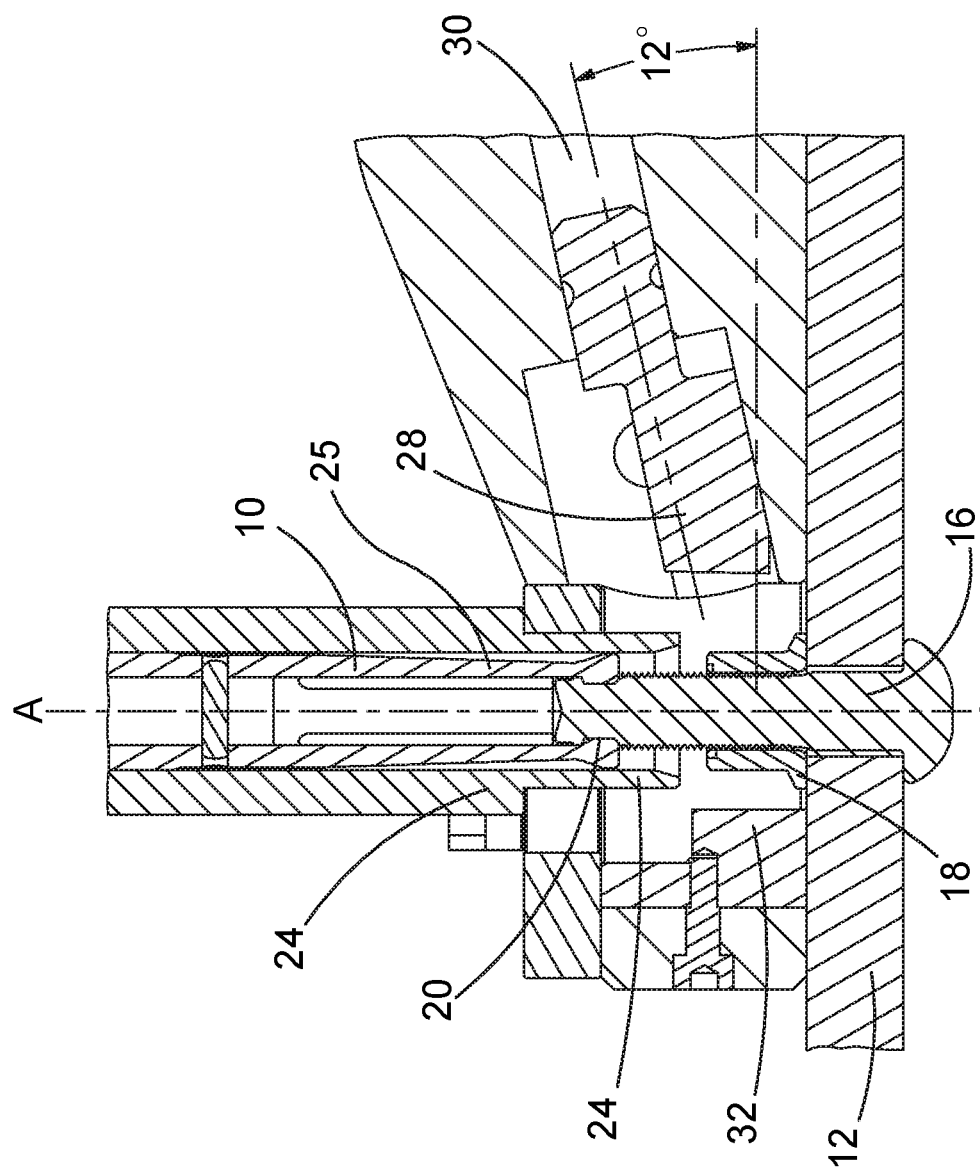
FIG. 5 shows a side sectional view of FIG. 4 with the apparatus coupled to a lockbolt, but before cutting of the collar therefrom.

The removal of a collar 18 from the pin 16 of a lockbolt is undertaken by firstly placing the apparatus 2 over the lockbolt. Reference now also to FIGS. 4 and 5 illustrate this. The collet 10 is of known type and has a series of axially extending fingers 25 circumferentially split and splayed and which are formed within an outer sleeve 24. The axial movement of the collet 10 within the outer sleeve 24 thereof provides a means for radially forcing together the splayed fingers of the collet 10 thereby to grip (or at least engage) the annular groove 20 of the pin 16. This is a known technique to those skilled in the art. Axial movement of the collet 10 within the outer sleeve 24 is governed by manual rotation of the knob 26 of turret 8. In this example, the combination of the collet 10, outer sleeve 24, turret 8 and knob 26 form a connection member by which the cutting apparatus is securely connected to the pin 16 of the lockbolt prior to removal therefrom of the collar 10.

In the illustration shown at FIG. 5, the collet 10 has been secured via the turret 8 and its manually actuable knob 26 to the annular recess 20 of the pin 16. As the knob 26 is rotated, the collet 10 moves radially upwards (with reference to FIG. 5) along the axis A-A, which is the major axis of the lockbolt defined by the axial extent of pin 16 when mounted within the sheet 12. As the collet 10 is constrained within the outer sleeve 24 and, on rotation of the knob 26 only the collet 10 and not the outer sleeve 24 moves axially, then the distal portions of the splayed fingers of collet 10 are drawn radially inwards as the collet 10 moves axially upwards to engage the annular groove 20. As the collet 10 moves axially upwards, the apparatus 2 engages the entire lockbolt, via pin 16, until no further axial movement of the apparatus 2 towards the sheet 12 is possible. At this point, the pin 16 is securely engaged by the apparatus 2.

Within the body of the cutting apparatus 2 and moveable radially toward and away from the pin 16, is formed a moveable cutting member, in this example, slidable cutting blade 28. The blade 28, formed here of hardened steel, sits within a channel 30 which is angled relative to a circumference to the axis A-A at, in this example, 12°, and which channel 30 permits the blade 28 to slide therein under the influence of pressurized oil supplied via port 6 toward the pin 16 and swaged collar 18. The reason for the 12° of the blade 28 orientation relative to a disc formed from a circumference to the axis A-A of the pin 16 will be explained below with reference to the cutting of the collar 10.

Before cutting of the collar 18 may take place, it is important that the collar is centrally located between the advancing blade 28 and an opposing member, preferably situated diametrically opposite the blade 28 and acting as a reaction element. In this example, the opposing member is a secondary cutting blade 32 fixed onto the main body 4.

Figure 7A:
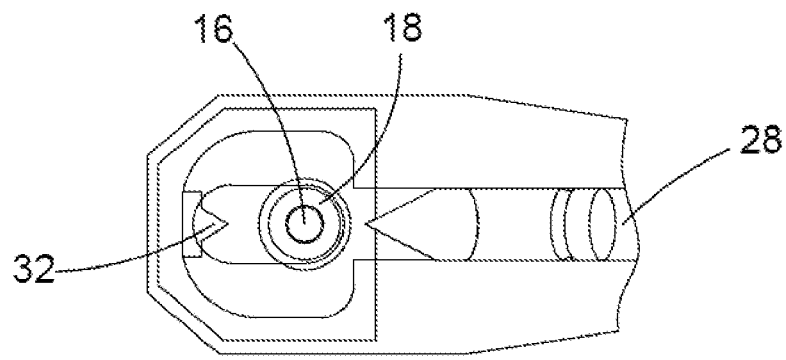
FIGS. 7A, 7B, 8A, 8B, 9A, 9B, 10A, 10B, 11A, and 11B show a series of progressive representations both in side section (A) and in plan view (B) from above of the advancement of the cutting operation of the apparatus of the previous figures.
Figure 7B:
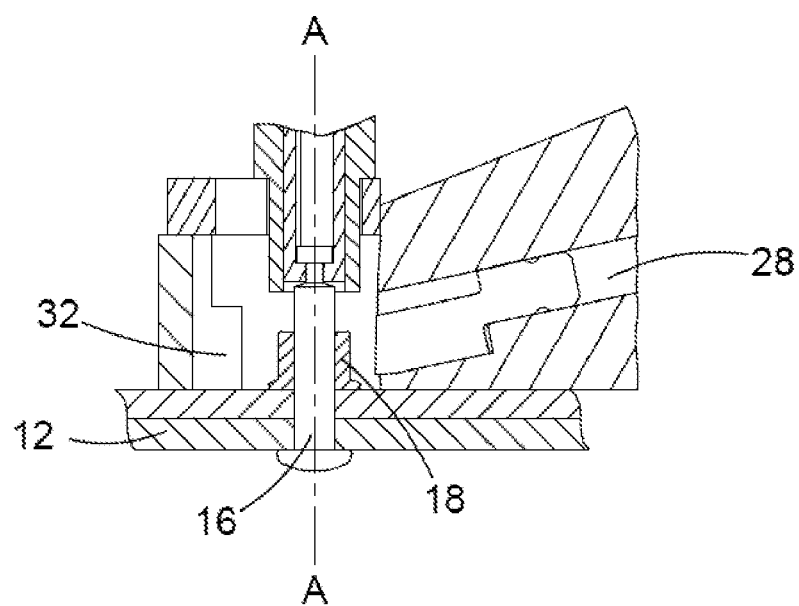

Referring now to FIGS. 7a and 7b, it can be seen that, with the turret 10 having been clamped (via the fingers 25) to the pin 16, the collar 18 cutting operation may commence. This is effected by the user permitting the pressurized oil to enter the apparatus via the port 6 to advance the blade 28 towards the collar. This may be achieved by any known means, such as actuation of a motorised pump, or hand-operated oil pump, for example. Those skilled in the art will appreciate the range of possibilities for this to be achieved and so is not shown in the drawings, for clarity.

Figure 8A:
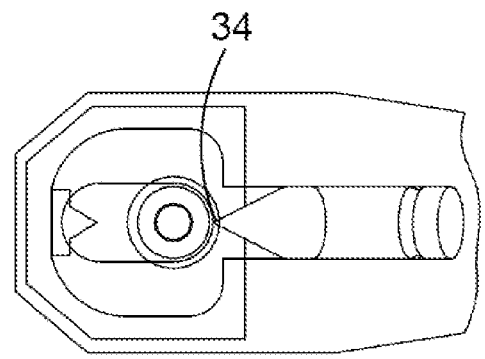
Figure 8B:
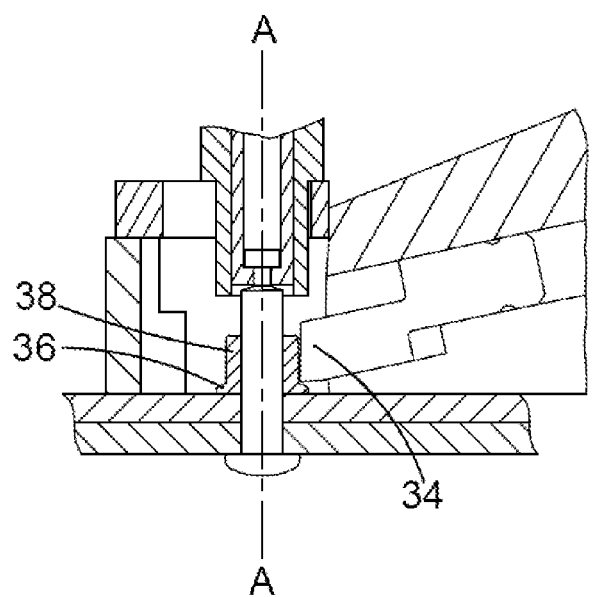

FIGS. 8a and 8b show the blade 28 having advanced (as compared with FIG. 7) to just reach the chamfered annular lower portion (36) of the collar 18. It can also be seen that the blade 28 contacts the collar just at the point where the annular flange (36) thereof meets the remainder of the body of the collar (here formed in a right cylinder, 38). This is due to the blade 28 advancing in its channel 30 toward the collar 18 at an angle of 12° relative to a circumferential disc about the collar. This 12° approach, along with the cutting edge of the blade 28 being designed so that it contacts the collar 18 with its major surface 34 parallel to the axis A-A, ensures that the blade 28 contacts the collar 18 at the junction of the annular flange 36 and the main body portion 38.

A further reason for moveable blade channel 30 to be angled at 12° relative to a circumferential disc about the collar 18 is that this geometrical arrangement permits a more compact apparatus than if the channel 30 were at 90° relative to the axis A-A.

The overall benefit of this arrangement is that the cutting blade 28 advances to contact the collar 18 in a manner such that the deflection of the blade is minimized and hence the quality of the subsequent cutting operation is not impaired.

It can be seen that the blade 28, being the only moving part in the drawings so far in the cutting operation, has contacted the collar 18 on its right hand side. There is an obvious distance between the left hand side of collar 18 and the secondary cutting blade 32 (situated diametrically opposite the blade 28), which is immovable, or fixed to the main body 4.

Figure 9A:
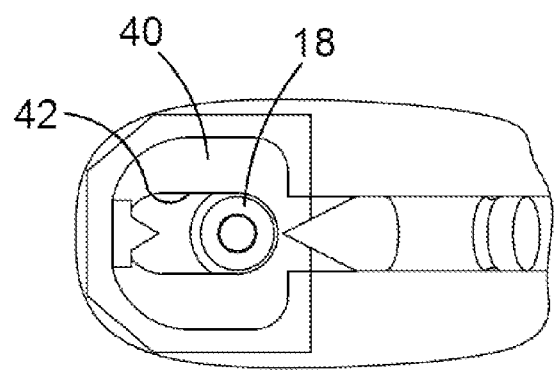
Figure 9B:
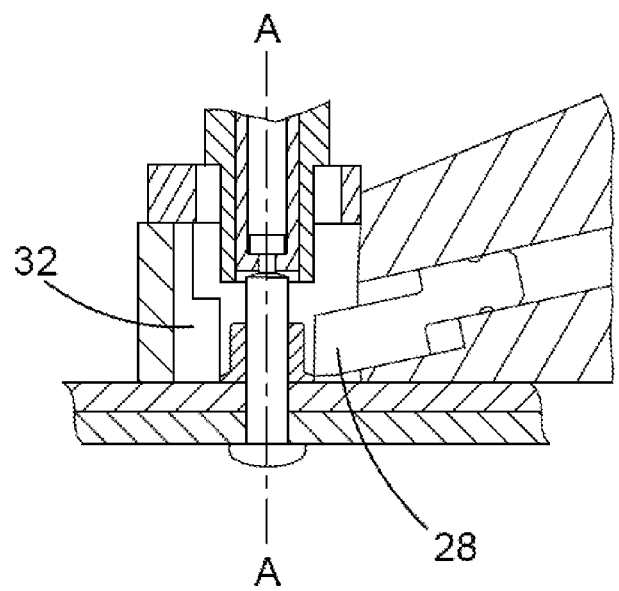

Referring now to FIGS. 9a and 9b, it can be seen that further advancement of the blade 28 as compared with the position shown in FIGS. 8a and 8b has resulted in the collar 18 having been centralized between the blade 28 and secondary blade 32. This centralisation, in this example, is due to relative movement between the collet 10 and its associated turret 8 on the one hand and the blade 28 on the other hand. If desired, however, it is possible that the relative movement could also be between the collet 10 and both of the blade 28 and secondary blade 32 or even between the collet 10 and the secondary blade 32. The important feature is that there is relative movement permitted so that the collar 18 is centralized between either elements which will cut it, or contribute to that cutting by providing a reaction surface during the cutting procedure.

Figure 6:
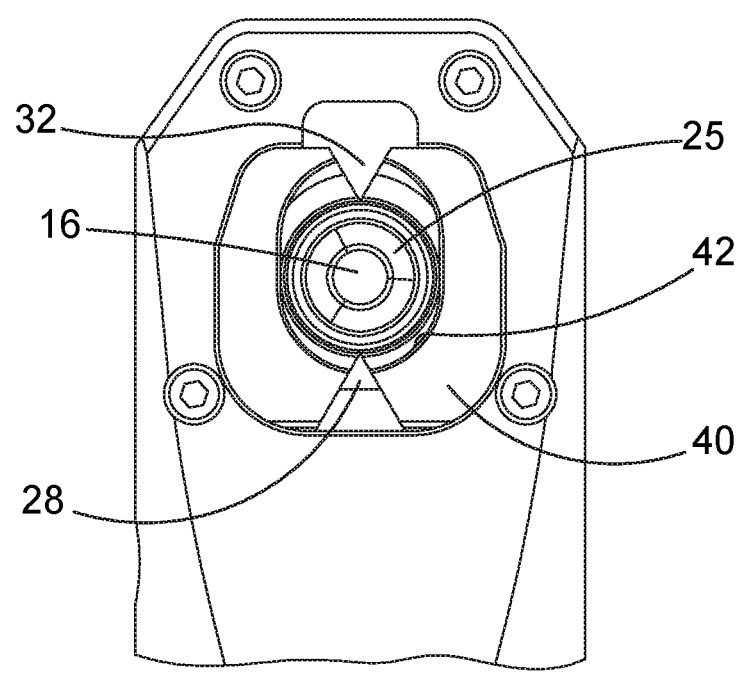
FIG. 6 shows a view from below of the apparatus of FIG. 1.

In this example, the relative movement between the blade 28 and collet 10 is achieved by the collet 10 and its turret 8 being mounted on a plate 40 which has an elongate recess 42 having a generally oblong, but with rounded, or curved, short sides, shape formed therein. In this example, the collet 10 is free to move in a fore-aft direction (which aligns with the diametric direction of travel of the blade 28) within the recess 42 under force applied to the collar 18 by the advancing blade 28. The plate 40 and recess 42 are most clearly shown in FIGS. 3 and 6. It can be seen that the movement of the collar 18, due to movement of the collet 10 and turret 8 is along a linear path which is a diametric path to the axis A-A. Whilst this is the most efficient path to follow, it is within the scope of the present invention for alternative paths of relative movement to be followed. For example, not only could non-diametric movement be possible, but also movement in a plane along the axis A-A might be advantageous in order to axially align the blades with the collar, in addition to radial alignment.

Figure 10A:
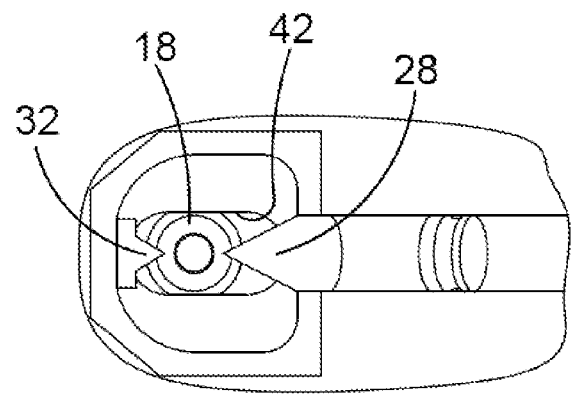
Figure 10B:
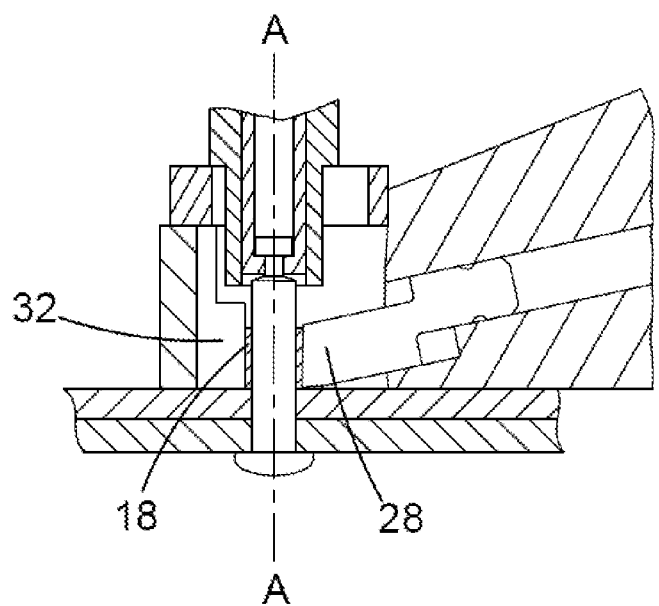

FIGS. 10a and 10b show how the advancing blade 28 and secondary blade 32, with the collar 18 centralised and held therebetween, cut the collar 18 from diametrically opposite sides. Blade 28 cuts the right hand side of collar 18 whilst secondary blade 32 cuts the left hand side thereof.

Figure 11A:
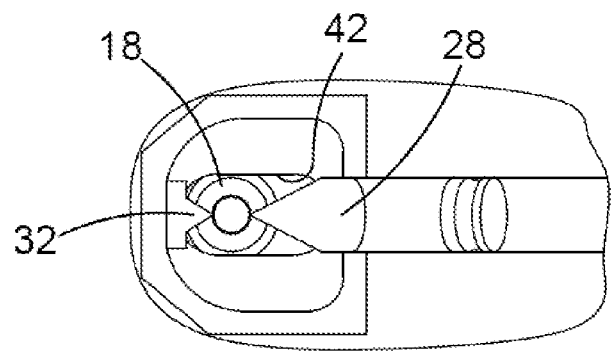
Figure 11B:
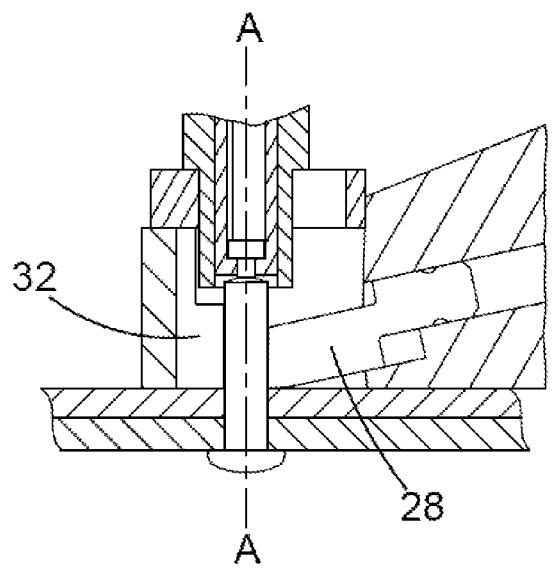

FIGS. 11a and 11b show the final position with the collar 18 having been completely cut. Cut 44 is the major one having been caused by the advancing blade 28, whilst the minor cut 46 is the passive one having been caused by the static secondary blade 32.

Whilst it is not essential, in order to achieve the benefits of the present invention, for the opposing member to also be a cutting blade as well as a reaction element, by making it so, it may serve the dual purpose of both assisting with centralisation of the collar prior to and during cutting and also enable cutting of the collar from two diametrically opposite sides simultaneously, hence assisting with its ready removal form the lockbolt after cutting. If it is desired for the opposing member (here secondary blade 32) to provide only a reaction force to the collar 18 against the cutting force applied to the diametrically opposite side thereto by the advancing cutting blade 28, then any suitable choice of member may be employed. Examples include steel plate, vee-block or otherwise hardened metal posts, or the like.

Those skilled in the art will appreciate that, whilst in the foregoing the relative movement required between, on the one hand, the connection member (here collet 10 and its associated turret 8) and, on the other hand, one or both of i) the at least one moveable blade (here blade 28) and ii) the opposing member (here secondary blade 32) is not limited to solely a translation movement of the connection member. The ability to permit relative movement between these elements so as to centralize the collar 18 for the cutting operation may equally be achieved by, for example, holding the collet 10 rigidly in place in the apparatus 2 whilst permitting movement of the blade 28 and/or secondary blade 32.

Although in the above example, the opposing member has been described by reference to an immovable secondary blade, it is within the scope of the invention for the opposing member to be moveable (or driven).

It will be appreciated that, whilst lockbolts of the type shown and described herein are most frequently used to hold together two or more items, such as sheets of metal, this is not necessarily always so. In the example described above, a single sheet 12 has been illustrated for the purposes of clarity rather than being a limiting factor. Lockbolts may also be employed to provide a threaded stud protruding form a surface, such as a single sheet, or as a location spigot, or the like, as will appreciated by those skilled in the art.

It will be understood that in the foregoing description, the use of the terms "axial" and "radial" are with respect to the major axis A-A as shown in the accompanying drawings.

LIST OF FEATURES 2 apparatus
4 main body
6 port for compressed air
8 turret
10 collet
12 sheet material
14 lockbolt
16 pin
18 collar
20 annular groove
22 lock grooves
24 outer sleeve
25 collet fingers
26 turret knob
28 moveable cutting blade
30 moveable blade channel
32 secondary cutting member
34 blade 28 major surface
36 collar flange
38 major body of collar
40 translation plate
42 oval hole in plate 40
44 major cut
46 minor cut

What is claimed is:

1. An apparatus for the removal of a circular collar swage-mounted on a cylindrical projection, the apparatus comprising:
   a connection member for connecting the apparatus to the cylindrical projection, which cylindrical projection defines a major axis (A-A) of the apparatus when the connection member is connected thereto;
   the connection member axially and upwardly engaging a gripping portion of the cylindrical projection;
   at least one moveable cutting member for selective engagement with the collar after the connection member is connected to the cylindrical projection;
   an opposing member arranged to be mounted within the apparatus opposite the at least one moveable cutting member;
   wherein, relative movement between the connection member and the at least one moveable cutting member and/or the opposing member permits the collar to be centrally located between the at least one moveable cutting member and the opposing member; and
   wherein the axially, upwardly engaging of the gripping portion is used to hold the cylindrical projection against movement during the swaging process.

2. The apparatus of claim 1, wherein the relative movement between the connection member and the at least one moveable cutting member and/or the opposing member comprises movement of the connection member.

3. The apparatus of claim 1, wherein the connection member is formed in a translation means, which translation means permits travel of the connection member in a linear path between the at least one moveable cutting member and the opposing member.

4. The apparatus of claim 3, wherein the linear path along the translation means is along a diameter with respect to the major axis, the circumferential ends of which diameter are between the at least one moveable cutting member and the opposing member, such that the translation means permits free travel along this diametric path.

5. The apparatus of claim 1, wherein the opposing member includes or comprises a second cutting member.

6. The apparatus of claim 1, wherein the opposing member is immovable.

7. The apparatus of claim 1, wherein the opposing member provides a reaction surface to the at least one cutting member.

8. The apparatus of claim 1, wherein the engagement of the at least one cutting member with the collar permits cutting of the collar from the cylindrical projection.

9. The apparatus of claim 5, wherein the opposing member also permits cutting of the collar from the cylindrical projection.

10. The apparatus of claim 1, wherein the connection member comprises an adjustable collet which clamps around the cylindrical projection.

* * * * *